(12) United States Patent
Nakamura et al.

(10) Patent No.: US 11,161,385 B2
(45) Date of Patent: Nov. 2, 2021

(54) VEHICLE STABILIZER AND METHOD OF MANUFACTURING THE SAME

(71) Applicant: NHK SPRING CO., LTD., Yokohama (JP)

(72) Inventors: Takahiro Nakamura, Yokohama (JP); Kenji Katsuno, Isehara (JP)

(73) Assignee: NHK SPRING CO., LTD, Kanagawa (JP)

( * ) Notice: Subject to any disclaimer, the term of this patent is extended or adjusted under 35 U.S.C. 154(b) by 88 days.

(21) Appl. No.: 16/571,483

(22) Filed: Sep. 16, 2019

(65) Prior Publication Data
US 2020/0009937 A1 Jan. 9, 2020

Related U.S. Application Data

(63) Continuation of application No. PCT/JP2018/005521, filed on Feb. 16, 2018.

(30) Foreign Application Priority Data

Mar. 16, 2017 (JP) .............................. JP2017-051335

(51) Int. Cl.
*B60G 21/055* (2006.01)
*F16B 11/00* (2006.01)

(52) U.S. Cl.
CPC .......... *B60G 21/0551* (2013.01); *F16B 11/00* (2013.01); *B60G 2202/135* (2013.01);
(Continued)

(58) Field of Classification Search
CPC ............. B60G 21/0551; B60G 21/055; B60G 2202/135; B60G 2206/427;
(Continued)

(56) References Cited

U.S. PATENT DOCUMENTS

| 5,185,908 A | * | 2/1993 | Oetiker | .................. B23K 33/00 |
| | | | | 24/20 R |
| 6,523,843 B2 | * | 2/2003 | Wiesemann | ....... B60G 21/0551 |
| | | | | 267/141.2 |

(Continued)

FOREIGN PATENT DOCUMENTS

| EP | 0543338 A1 | 5/1993 |
| EP | 1071571 A1 | 1/2001 |

(Continued)

OTHER PUBLICATIONS

International Search Report (ISR) dated Apr. 24, 2018 (and English translation thereof) issued in International Application No. PCT/JP2018/005521.

(Continued)

*Primary Examiner* — Ruth Ilan
*Assistant Examiner* — Caitlin Anne Miller
(74) *Attorney, Agent, or Firm* — Holtz, Holtz & Volek PC

(57) ABSTRACT

A stabilizer is provided with a restriction ring connected to a torsion portion at a connection portion adjacent to a bush. The restriction ring has a body, a female portion, a male portion, and a welded portion. The female portion has gripping portions with a spacing therebetween decreasing in the direction away from a valley bottom portion. The male portion has a neck portion, an expansion portion, and a contraction portion. The welded portion covers at least the range of the contraction portion and the valley bottom portion and melts in the plate thickness direction from the outer peripheral surface.

8 Claims, 9 Drawing Sheets

(52) U.S. Cl.
CPC .. *B60G 2204/1222* (2013.01); *B60G 2204/41* (2013.01); *B60G 2206/8102* (2013.01); *B60G 2206/8201* (2013.01)

(58) Field of Classification Search
CPC .... B60G 2206/8102; B60G 2206/8208; B60G 2206/8209; B60G 2204/1222; B60G 2204/41; B60G 2204/45; F16B 11/00; F16F 1/16
See application file for complete search history.

(56) References Cited

U.S. PATENT DOCUMENTS

| | | | | |
|---|---|---|---|---|
| 6,557,216 B1 * | 5/2003 | Andre | ................ | B21D 39/037 |
| | | | | 24/20 CW |
| 6,685,381 B1 * | 2/2004 | Sugita | ................ | B60G 9/00 |
| | | | | 280/124.152 |
| 7,635,139 B2 * | 12/2009 | Narishima | ......... | B60G 21/0551 |
| | | | | 280/124.13 |
| 2006/0043692 A1 * | 3/2006 | Cai | ................ | B60G 21/0551 |
| | | | | 280/124.152 |
| 2007/0074940 A1 * | 4/2007 | Narishima | ......... | B60G 21/0551 |
| | | | | 188/321.11 |
| 2012/0228846 A1 * | 9/2012 | Zuber | ................ | B60G 21/0551 |
| | | | | 280/124.106 |
| 2017/0050488 A1 * | 2/2017 | Katsuno | ................ | B60G 21/04 |

FOREIGN PATENT DOCUMENTS

| | | | | |
|---|---|---|---|---|
| JP | 2001163026 A | * | 6/2001 | ......... B60G 21/0551 |
| JP | 2001163026 A | | 6/2001 | |
| JP | 2005271886 A | | 10/2005 | |
| JP | 2015151083 A | | 8/2015 | |

OTHER PUBLICATIONS

Written Opinion of the International Search Authority dated Apr. 24, 2018 issued in International Application No. PCT/JP2018/005521.
Extended European Search Report (EESR) dated Dec. 2, 2020 issued European Application No. 18766767.0.

* cited by examiner

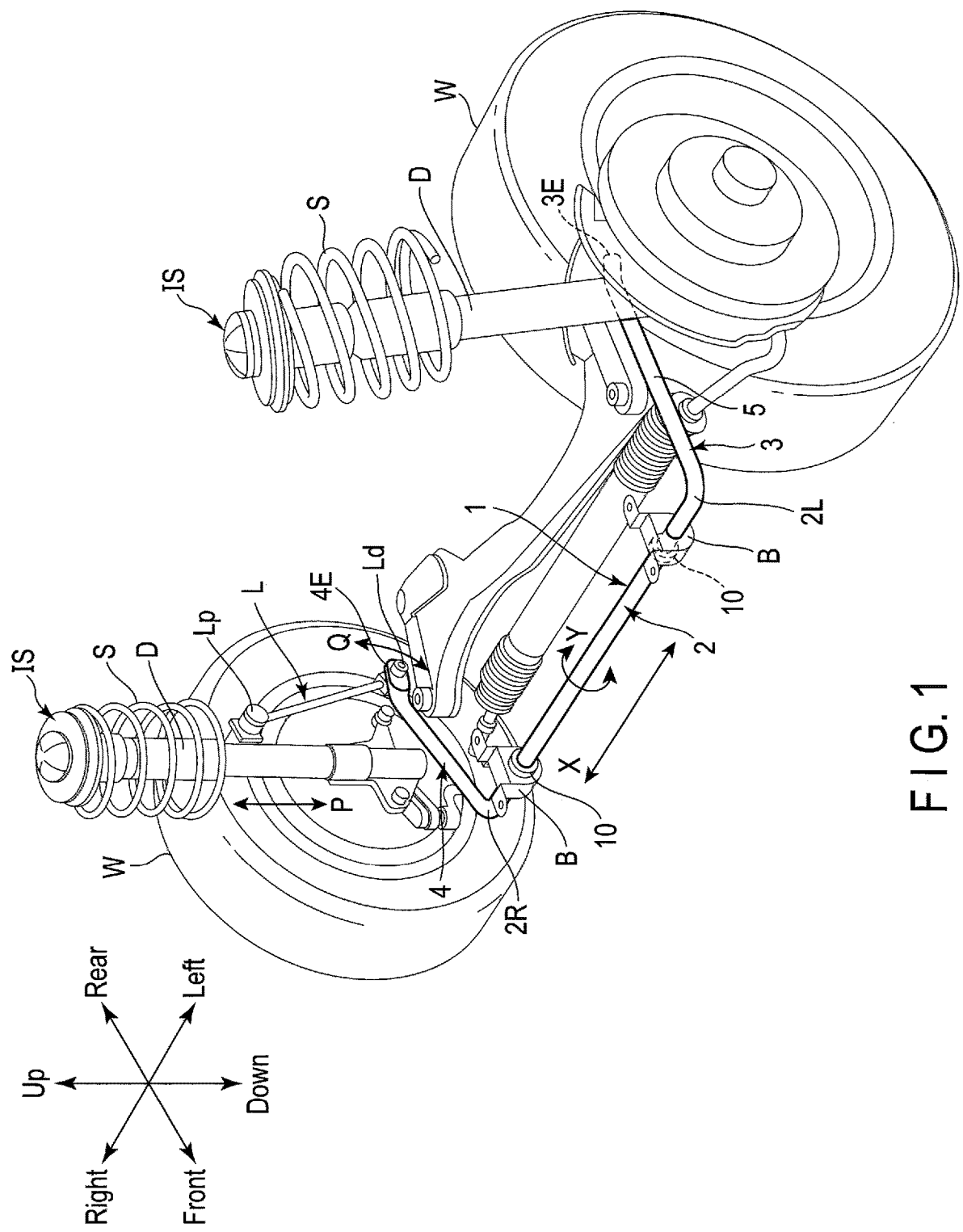
F I G. 1

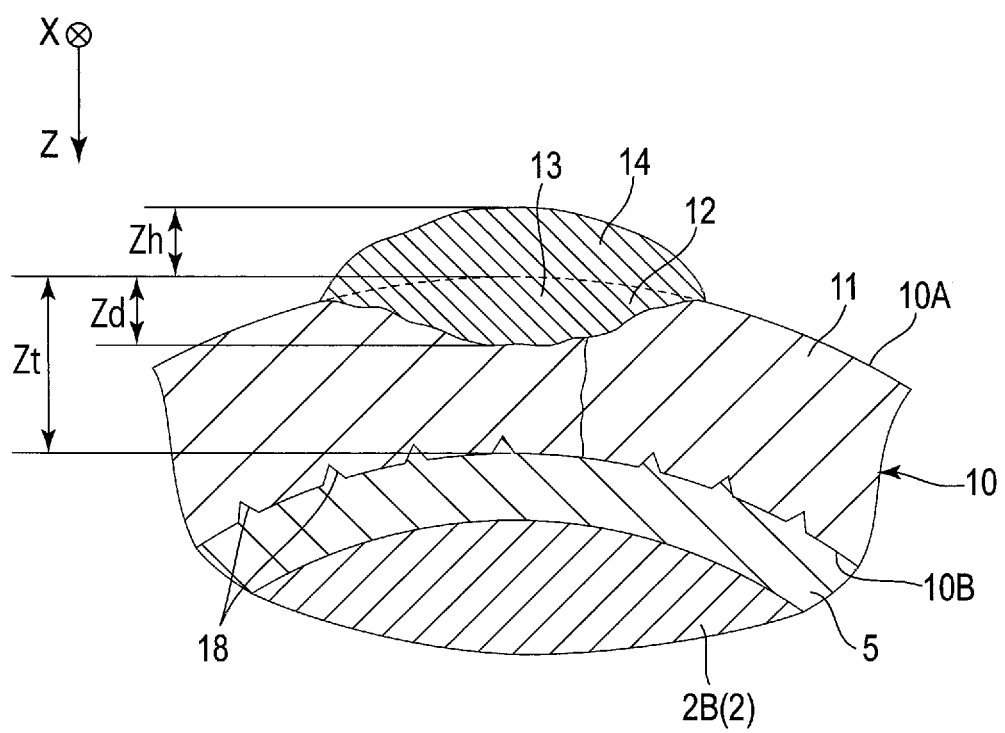
F I G. 4

VEHICLE STABILIZER AND METHOD OF MANUFACTURING THE SAME

CROSS-REFERENCE TO RELATED APPLICATIONS

This application is a Continuation Application of PCT Application No. PCT/JP2018/005521, filed Feb. 16, 2018 and based upon and claiming the benefit of priority from prior Japanese Patent Application No. 2017-051335, filed Mar. 16, 2017, the entire contents of all of which are incorporated herein by reference.

BACKGROUND OF THE INVENTION

1. Field of the Invention

The present invention relates generally to a stabilizer for vehicle comprising a restriction ring that restricts movement in an axial direction, and a method of manufacturing the stabilizer.

2. Description of the Related Art

A vehicle such as an automobile comprises a stabilizer that interlocks suspension units of right and left wheels to suppress rolling of the vehicle body and improve traveling stability. The stabilizer is a rod member of spring steel bent in a U-letter shape, and comprises a torsion portion suspended from a bottom surface of the vehicle body via a cylindrical bush, and a pair of arm portions attached to stabilizer links of the suspension units.

When the vehicle turns, the spring of the suspension unit on the outer wheel side is compressed by the centrifugal force, and the spring of the suspension unit on the inner wheel side is extended. At this time, an arm attached to the outer wheel side is pushed upward, and an arm attached to the inner wheel side is pushed downward. The torsion portion is not completely fixed to the bush, but rotates in the circumferential direction Y to generate a torsional stress. The restoring force of the twisted torsion portion acts in the direction in which the vehicle is in a horizontal position to suppress the rolling of the vehicle body.

However, the stabilizer link is attached obliquely to the extending and contracting direction of the spring. When the spring extends and contracts, not only a load that twists the torsion portion in the circumferential direction, but also a component load that attempts to move the torsion portion in the axial direction are input to the stabilizer. If the position of the stabilizer is shifted in the axial direction, the stabilizer interferes with the accessory of the vehicle to generate noise. In addition, the spring characteristics of the stabilizer may change to change the ride quality of the vehicle.

A stabilizer provided with a restriction ring that abuts on the bush and restricts the movement of the torsion portion to prevent displacement of the stabilizer, has been proposed (for example, see Patent Literature 1 (JP 2015-151083 A) and Patent Literature 2 (JP 2005-271886 A)). However, when the weight of the vehicle increases, the component load for moving the torsion portion in the axial direction increases. If the restriction ring is applied to a stabilizer mounted on a large vehicle, the restriction ring cannot withstand the component load and may fall off.

BRIEF SUMMARY OF THE INVENTION

Embodiments described herein aim to provide a stabilizer comprising a restriction ring that can withstand a large component load and capable of preventing axial displacement, and a method of manufacturing the same.

A stabilizer according to one of the embodiments is provided at a vehicle, and comprises a torsion portion, a pair of arms, and a restriction ring. The torsion portion is suspended from the vehicle body via a bush. The pair of arms extend from both ends of the torsion portion toward right and left wheels, respectively, and are attached to a suspension unit. The restriction ring is coupled to the torsion portion at a location adjacent to the bush. The restriction ring includes a main body, a female portion, a male portion, and a weld portion. The main body is formed in a band shape. The female portion includes a valley bottom portion and a pair of sandwiching portions. The valley bottom portion is located at one end of the main body. The pair of sandwiching portions are spaced apart from each other in the axial direction of the torsion portion, and the distance becomes narrower as the distance from the valley bottom portion increases. The male portion includes a neck, an expanding portion, and a contracting portion. The neck extends from the other end of the main body, and is inserted between distal ends of the pair of sandwiching portions. The expanding portion becomes larger in the axial direction of the torsion portion as the portion is farther from the neck. The contracting portion becomes smaller in the axial direction of the torsion part as the portion is farther from the neck. At the weld portion, the male portion and the female portion are welded. The weld portion covers at least the range of the contracting portion and the valley bottom portion as viewed from the outer peripheral surface of the restriction ring, and is melted in the thickness direction from the outer peripheral surface to integrate the contracting portion and the valley bottom portion.

A stabilizer manufacturing method according to one of the embodiments comprises a preparation step, a caulking step, and a welding step. In the preparation step, the main body is arranged to be wound around the torsion portion. In the caulking step, the female portion is pressed against the male portion, and the pair of sandwiching portions are plastically deformed into a shape that follows the expanding portion. In the welding step, welding is performed so as to cover at least the range of the contracting portion and the valley bottom portion as viewed from the outer peripheral surface of the restriction ring. The weld portion that is welded in the thickness direction from the outer peripheral surface to integrate the contracting portion and the valley bottom portion is thereby formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing an example of a stabilizer according to an embodiment in a state of being mounted on a vehicle.

FIG. 4 is a cross-sectional view taken along line F4-F4 in FIG. 3.

DETAILED DESCRIPTION OF THE INVENTION

Figure 2:
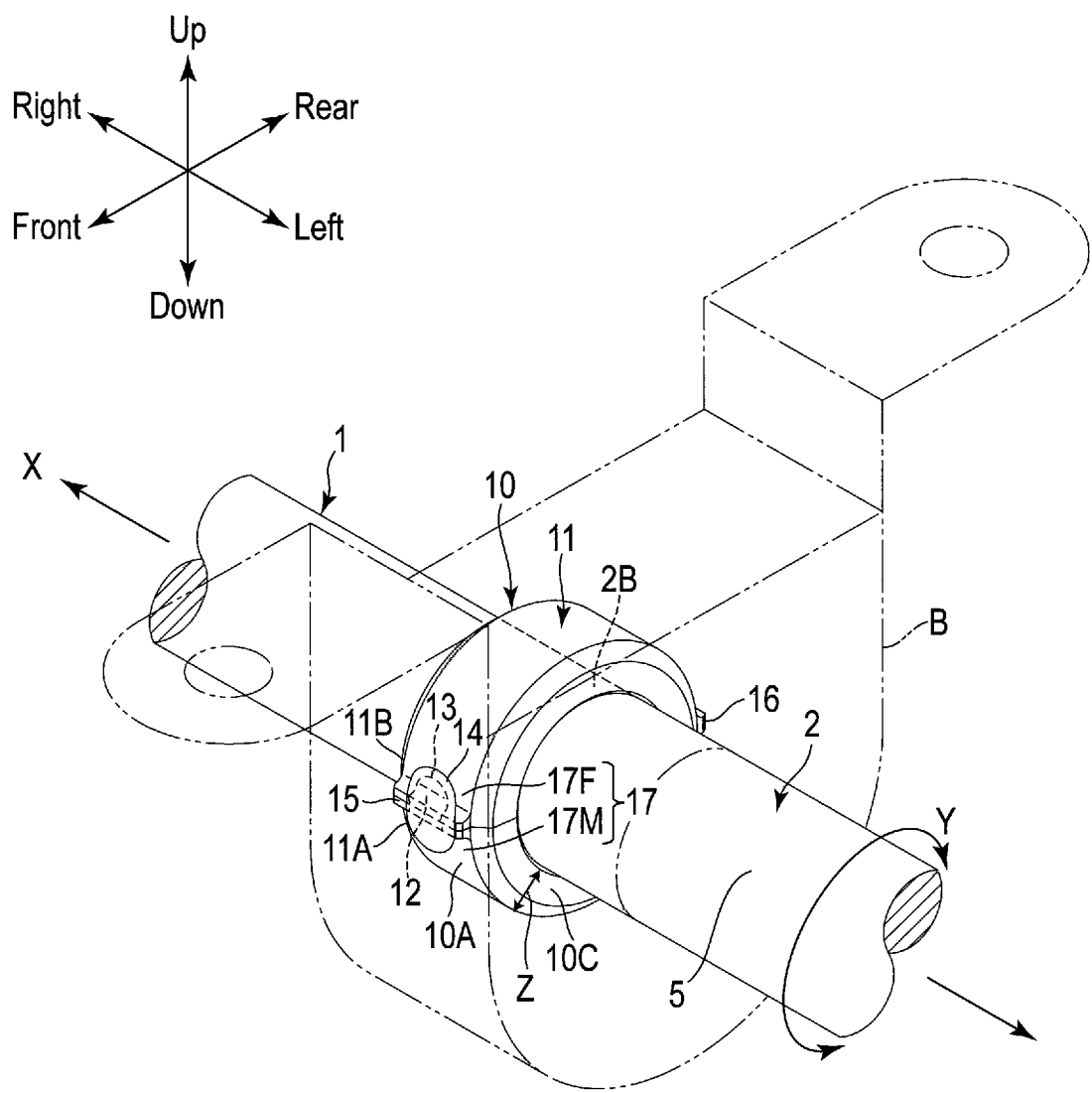
FIG. 2 is an enlarged perspective view of a restriction ring shown in FIG. 1.

One of the embodiments of the present invention will be described hereinafter with reference to the accompanying drawings.

A stabilizer 1 according to one of embodiments of the present invention will be explained hereinafter with reference to FIG. 1 to FIG. 14. FIG. 1 is a perspective view showing an example of the stabilizer 1 in a state of being mounted on a vehicle. The stabilizer (stabilizer bar) 1 is formed by bending a bar of spring steel into a U-shape.

Examples of the steel type are, for example, SAE10B21, SAE15B26, SAE5160, etc., conforming to the regulations of the American Association of Automotive Engineers or, for example, SUP9, etc., conforming to JIS or, for example, 26MnB5, 34MnB5, etc. The steel type of the stabilizer 1 is not limited to only spring steel, but may be high strength steel or steel for carburization. The stabilizer 1 is covered with a coating film 5 such as an epoxy-based paint containing a corrosion-resistant component.

The stabilizer 1 includes a torsion portion 2, a pair of arm portions 3 and 4, and a restriction ring 10. The torsion portion 2 is formed in a substantially linear shape extending in the vehicle width direction (right and left direction) of the vehicle. The pair of arm portions 3 and 4 extend from both ends 2L and 2R of the torsion portion 2 toward right and left wheels W, respectively. Eyes 3E and 4E are formed at distal ends of the arms 3 and 4, respectively.

Suspension units IS are attached to the right and left wheels W, respectively. The suspension device IS comprises, for example, a spring S, a damper D, and a stabilizer link L. The spring S and the damper D support the wheel W. A proximal end Lp of the stabilizer link L is attached to the damper D. The stabilizer link L is inclined with respect to the expansion and contraction direction P of the spring S and, when the spring S expands and contracts, the distal end Ld of the stabilization link L rocks in a direction Q different from the expansion and contraction direction P of the spring S.

The torsion portion 2 of the stabilizer 1 is suspended from the vehicle body via a cylindrical bush (bearing cylinder) B. The torsion portion 2 is not completely fixed to the bush B, but can rotate in the circumferential direction Y to generate a torsional stress. The pair of arms 3 and 4 are connected to the distal ends Ld of the stabilizer links L of the suspension units IS by the eyes 3E and 4E.

The restriction ring 10 that restricts the movement of the torsion portion 2 is coupled to the torsion portion. The restriction ring 10 is coupled to the coupling site 2B adjacent to the bush B and, when the component load is input to the stabilizer 1, the restriction ring 10 abuts on the bush B to prevent the movement of the torsion portion 2 in the axial direction X. The axial direction X of the torsion portion 2 coincides with the width direction of the vehicle. The restriction ring 10 may be adjacent to the bush B from the inside in the axial direction X or may be adjacent from the outside.

FIG. 2 is an enlarged perspective view of the restriction ring 10 shown in FIG. 1. As shown in FIG. 2, the restriction ring 10 includes a main body 11, a male portion 12, a female portion 13, and a weld portion 14. In the example shown in FIG. 2, the restriction ring 10 further includes thick portions 15 and 16 and a surrounding portion 17.

The main body 11 is formed in a strip shape extending in the circumferential direction Y of the torsion portion 2. The male portion (first locking portion) 12 is formed at one end 11A of the main body 11. The female portion (second locking portion) 13 is formed on the other end 11B of the main body 11 and is locked to the male portion 12. The weld portion 14 is formed of the same type of metal material as the male portion 12 and the female portion 13, in a substantially circular shape, and welds the male portion 12 and the female portion 13.

The thick portions 15 and 16 are formed to be thicker by 0.5 mm or more than the other parts of the restriction ring 10. The thick portion 15 is formed in a strip shape crossing the male portion 12 and the female portion 13 in the width direction of the restriction ring 10. The width direction of the restriction ring coincides with the axial direction X of the torsion portion 2 and the vehicle width direction of the vehicle. The thick portion 16 is formed on a side opposite to the thick portion 15 at 180°, in the circumferential direction Y.

The surrounding portion 17 is provided across the one end 11A and the other end 11B of the main body 11, and surrounds the weld portion 14. In the surrounding portion 17, the outer peripheral surface 10A and the side surface 10C of the restriction ring 10 are exposed from the weld portion 14. The surrounding portion 17 includes a male side surrounding portion 17M provided at one end 11A of the main body 11, and a female side surrounding portion 17F provided at the other end 11B.

The male side surrounding portion 17M is formed integrally with the male portion 12. The female side surrounding portion 17F is formed integrally with the female portion 13.

The male side surrounding portion 17M and the female side surrounding portion 17F are flush with each other in the axial direction X of the torsion portion 2. In the surrounding portion 17, the weld portion 14 is eliminated. That is, in the male portion 12 and the female portion 13, the side surface 10C formed by the male side surrounding portion 17M and the female side surrounding portion 17F is formed to be flat. The side surface 10C of the restriction ring 10 abuts on the bush B when the component load is input to the torsion portion 2.

Figure 3:
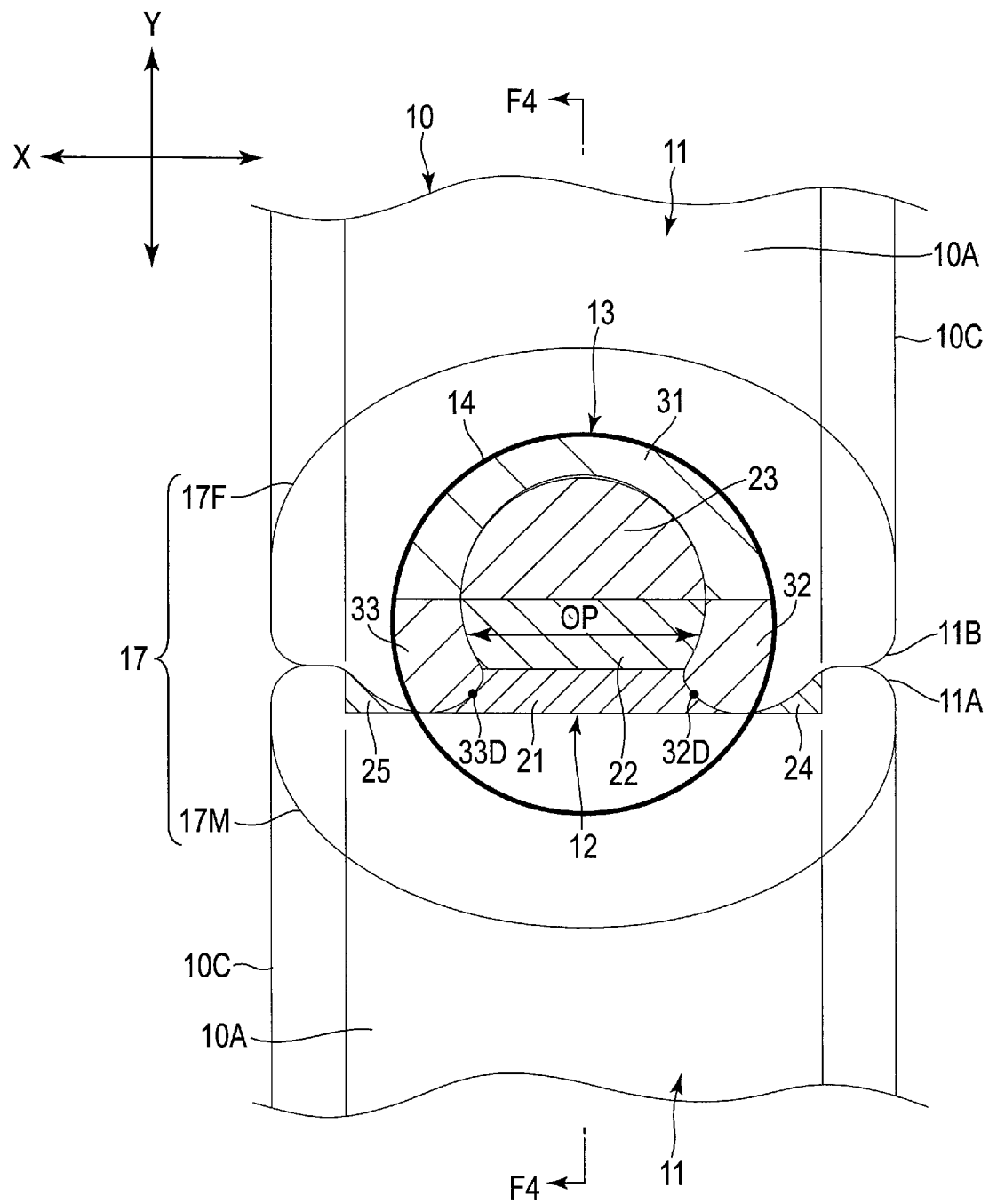
FIG. 3 is an enlarged side view showing a male portion and a female portion shown in FIG. 2.

FIG. 3 is an enlarged side view showing the male portion 12 and the female portion 13 of the restriction ring 10. As shown in FIG. 3, the female portion 13 is formed in a concave shape opened toward the male portion 12 and includes a valley bottom portion 31 and a pair of sandwiching portions 32 and 33. The valley bottom portion 31 constitutes the bottom of the female portion 13 at the other end 11B of the main body 11. The pair of sandwiching portions 32 and 33 are arranged and spaced apart from each other at an interval OP in the width direction (axial direction X) of the restriction ring 10.

As the pair of sandwiching portions 32 and 33 are located farther from the valley bottom portion 31 in the circumferential direction Y, the interval OP in the axial direction X becomes narrower. The direction from the top to the bottom in FIG. 3 is the direction in which the sandwiching portions are located farther from the valley bottom portion 31. The direction from the top to the bottom in FIG. 3 may be rephrased as the direction from the one end 11A to the other end 11B in the main body 11 or the direction from the main body 11 to the female portion 13. Distal ends 32D and 33D of the pair of sandwiching portions 32 and 33 constitute a path having a narrower interval OP than the other parts of the female portion 13.

The male portion 12 is formed in a convex shape protruding toward the female portion 13 and includes a neck portion 21, an expanding portion 22, a contracting portion 23, and guide portions 24 and 25. The neck portion 21 extends from one end 11A of the main body 11 and is formed to be narrower than the main body 11. The neck portion 21 is inserted between the distal ends 32D and 33D of the pair of sandwiching portions 32 and 33.

The expanding portion 22 becomes larger in the width direction (axial direction X) of the restriction ring 10 as the portion is located farther from the neck portion 21. The contracting portion 23 becomes smaller in the width direction of the restriction ring 10 as the portion is located farther from the neck portion 21. The direction from the bottom to the top in FIG. 3 is the direction of being located farther from the neck portion 21. The direction from the bottom to the top in FIG. 3 may be rephrased as the direction from the other end 11B to the one end 11A in the main body 11 or the direction from the main body 11 to the male portion 12.

In the example shown in FIG. 3, the contracting portion 23 is formed in a semicircular shape. The expanding portion 22 is formed in a semicircular shape except for a portion connected to the neck portion 21. The guide portions (shoulders) 24 and 25 are provided on both sides of the neck portion 21, respectively, in the width direction of the restriction ring 10 so as to sandwich the neck portion 21. The guide portions 24 and 25 are formed with inclined surfaces that are closer to the neck portion 21 from the male portion 12 toward the main body 11.

The weld portion 14 covers at least the range of the contracting portion 23 of the male portion 12 and the valley bottom portion 31 of the female portion 13 as viewed from the outer peripheral surface 10A of the restriction ring 10. In the example shown in FIG. 3, the weld portion 14 covers the contracting portion 23, the expanding portion 22, and the neck portion 21 of the male portion 12, and the valley bottom portion 31 and the distal ends 32D and 33D of the holding portions 32 and 33, of the female portion 13. Furthermore, the weld portion 14 has a circular shape as viewed from the outer peripheral surface 10A of the restriction ring 10.

FIG. 4 is a sectional view taken along line F4-F4 of FIG. 3. As shown in FIG. 4, the weld portion 14 is melted in the thickness direction Z from the outer peripheral surface 10A of the restriction ring 10 to integrate the contracting portion 23 of the male portion 12 and the valley bottom portion 31 of the female portion 13. A thickness of the restriction ring 10 at a part different from the thick portions 15 and 16 is referred to as Zt. The height Zh of the weld portion 14 is, for example, ½ or less of the thickness Zt of the restriction ring 10.

An uneven pattern 18 harder than the coating film 5 of the torsion portion 2 is formed on the inner peripheral surface 10B of the restriction ring 10, and the uneven pattern 18 matches the coating film 5. The uneven pattern 18 can be formed, for example, by knurling. The coating film 5 of the coupling site 2B to which the restriction ring 10 is coupled may be formed to be thicker than the coating film 5 of the eyes 3E and 4E. The coating film 5 can be formed by, for example, powder baking finish. The thickness of the coating film 5 can be adjusted in accordance with, for example, the coating time or the number of times of coating.

The restriction ring 10 is formed of, for example, a metal material such as aluminum or an aluminum alloy, and is attached to the torsion portion 2 later. The restriction ring 10 in a state before being coupled to the torsion portion 2 is formed in a band shape curved in a C letter. In the restriction ring 10 in this state, the interval OP between the pair of sandwiching portions 32 and 33 shown in FIG. 4 is constant, and the distal ends 32D and 33D are not narrow paths.

The manufacturing method for manufacturing the stabilizer 1 of the present embodiment comprises a preparation step, a caulking step, and a welding step. In the preparation step, the main body 11 of the restriction ring 10 is disposed so as to be wound around the torsion portion 2. In the caulking step, the female portion 13 is pressed against the male portion 12 to plastically deform the sandwiching portions 32 and 33 of the female portion 13 into a shape that follows the expanding portion 22 of the male portion 12.

When the female portion 13 is pressed against the male portion 12, the pair of sandwiching portions 32 and 33 are guided by the inclined surfaces of the guide portions 24 and 25 and deform toward the neck portion 21. Eventually, the pair of sandwiching portions 32 and 33 are formed in a shape that follows the expanding portion 22, and the female portion 13 is engaged with the male portion 12. In the welding step, the male portion 12 and the female portion 13 are welded to form the weld portion 14 shown in FIG. 2 and FIG. 3.

At this time, a small gap may occur between the contracting portion 23 and the valley bottom portion 31 due to spring back as shown in FIG. 3. That is, in the restriction ring 10 formed in the caulking step, the contracting portion 23 and the valley bottom portion 31 are cut, and the contracting portion 23 does not contribute to the coupling force of the restriction ring 10.

However, the manufacturing method according to the present embodiment includes the welding step after the caulking step. In the welding step, as shown in FIG. 3 and FIG. 4, the weld portion 14 in which the contracting portion 23 and the valley bottom portion 31 are integrated is formed. In addition to the engagement between the expanding portion 22 and the pair of sandwiching portions 32 and 33, the restriction ring 10 having undergone the welding step further has an engagement between the contracting portion 23 and the valley bottom portion 31.

First to seventh examples and first and second comparative examples of forming the weld portion 14 of various shapes in the welding step will be explained hereinafter with reference to FIG. 5 to FIG. 13. All of the first to seventh examples and the first and second comparative examples are common with respect to a feature of forming the contracting portion 23 having a diameter of 5 mm on the restriction ring 10 having a width of 14 mm and a thickness Zt of 4.2 mm. The range indicated by oblique lines upward to the right in FIG. 5 to FIG. 8 corresponds to the thick portion 15 and is formed to be thicker than the thickness Zt by 0.5 mm or more.

Figure 5:
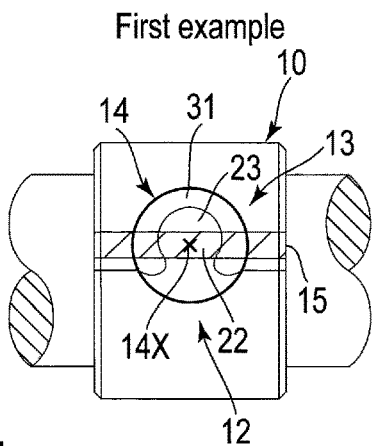
FIG. 5 is a side view showing a first example in which a weld portion having a diameter of 10 mm is formed at the center of a male portion.

In the first example, as shown in FIG. 5, the weld portion 14 having a diameter of 10 mm and a height Zh of 2 mm was formed at the center of the male portion 12. The center 14X of the weld portion 14 overlaps the thick portion 15.

Figure 6:
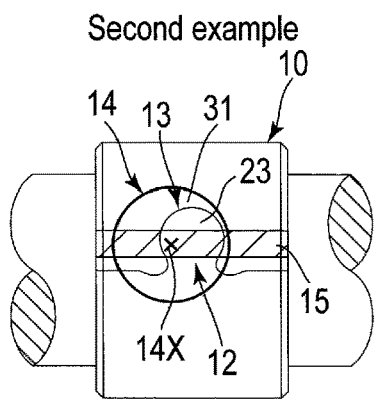
FIG. 6 is a side view showing a second example in which a weld portion having a diameter of 10 mm is formed to be shifted in the width direction as compared with the first example.

In the second example, as shown in FIG. 6, the weld portion 14 having a diameter of 10 mm and a height Zh of 2 mm is formed to be shifted in the width direction as compared with the first example. The center 14X of the weld portion 14 overlaps the thick portion 15.

Figure 7:
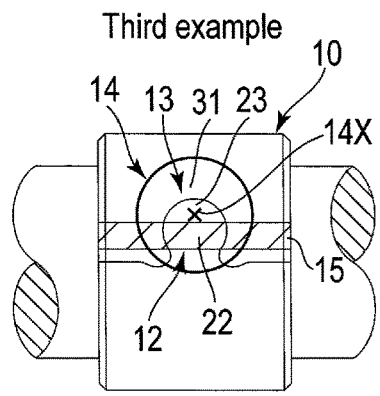
FIG. 7 is a side view showing a third example in which a weld portion having a diameter of 10 mm is formed to be shifted to the contracting portion side as compared with the first example.

In the third example, as shown in FIG. 7, the weld portion 14 having a diameter of 10 mm and a height Zh of 2 mm was formed to be shifted toward the side of the contracting portion 23 of the male portion 12 as compared with the first example. The center 14X of the weld portion 14 is excluded from the range of the thick portion 15.

Figure 8:
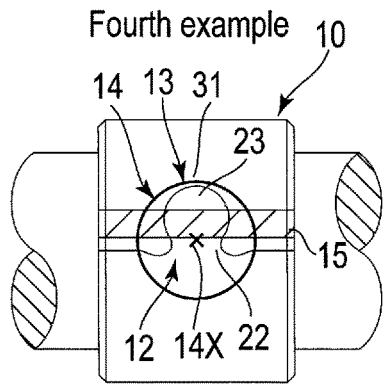
FIG. 8 is a side view showing a fourth example in which a weld portion having a diameter of 10 mm is formed to be shifted to an expanding portion side as compared with the first example.

In the fourth example, as shown in FIG. 8, the weld portion 14 having a diameter of 10 mm and a height Zh of 2 mm is formed to be shifted toward the side of the expanded portion 22 of the male portion 12 as compared with the first example. The center 14X of the weld portion 14 is excluded from the range of the thick portion 15.

Figure 9:
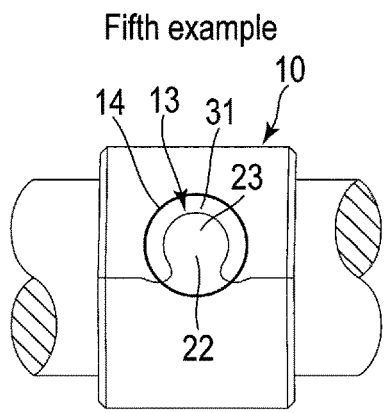
FIG. 9 is a side view showing a fifth example in which a weld portion having a diameter of 8 mm is formed at the center of a male portion.

In the fifth example, as shown in FIG. 9, the weld portion 14 having a diameter of 8 mm and a height Zh of 2 mm was formed. The height Zh of the weld portion 14 is half or less of the thickness Zt of the restriction ring 10.

Figure 10:
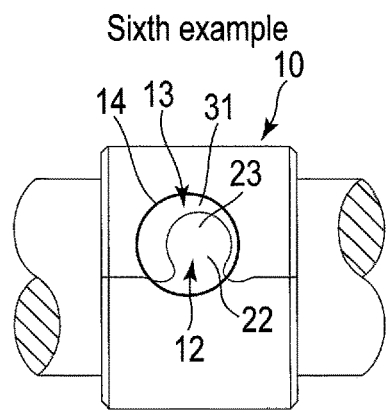
FIG. 10 is a side view showing a sixth example in which a weld portion having a diameter of 8 mm is formed to be shifted in the width direction as compared with the fifth example.

In the sixth example, as shown in FIG. 10, the weld portion 14 having a diameter of 8 mm and a height Zh of 2 mm is formed to be shifted in the width direction as compared with the fifth example. The height Zh of the weld portion 14 is half or less of the thickness Zt of the restriction ring 10.

Figure 11:
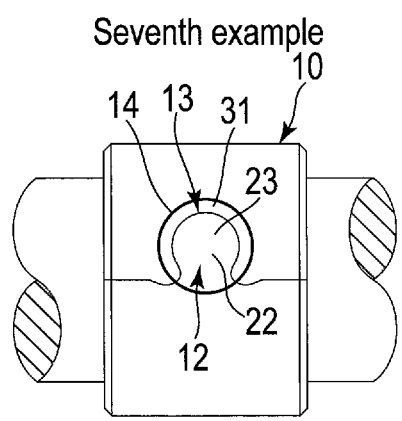
FIG. 11 is a side view showing a seventh example in which a weld portion having a diameter of 7 mm is formed.

In the seventh example, as shown in FIG. 11, the weld portion 14 having a diameter of 7 mm and a height Zh of 3 mm was formed. The height Zh of the weld portion 14 exceeds one half of the thickness Zt of the restriction ring 10.

Figure 12:
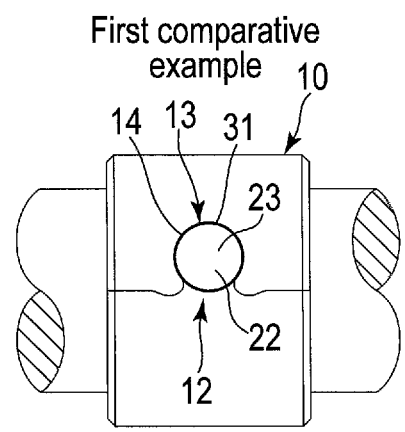
FIG. 12 is a side view showing a first comparative example in which a weld portion having a diameter of 5 mm is formed.

In the first comparative example, as shown in FIG. 12, the weld portion 14 having a diameter of 5 mm was formed.

In the second comparative example, the weld portion 14 was not formed.

Figure 13:
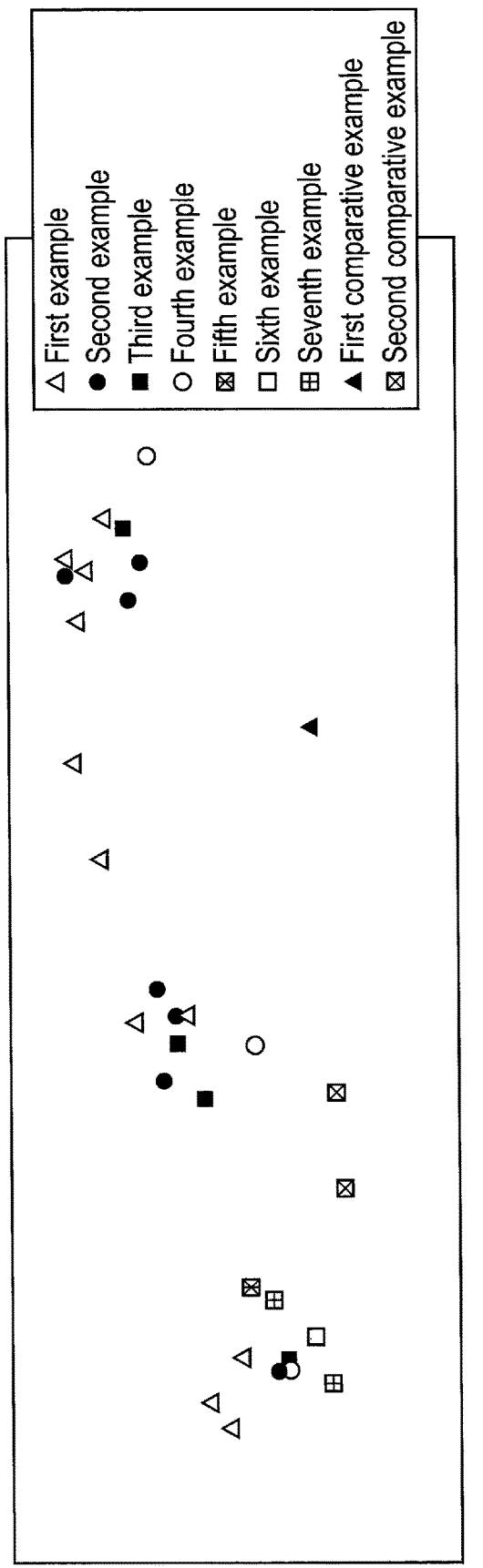
FIG. 13 is a graph showing a coupling force of a restriction ring measured for each example and comparative example.

FIG. 13 is a graph showing a coupling force of the restriction ring 10 measured for the first to seventh examples and the first and second comparative examples. The coupling site 2B to which the restriction ring 10 is coupled and its vicinity are cut out as a test piece, and a jig having the same shape as the bush B is pressed against the restriction ring 10 to measure the load when the restriction ring 10 is broken.

As shown in FIG. 13, as the thickness of the coating film 5 at the coupling site 2B is larger, the coupling force of the restriction ring 10 increases. Comparing the same thickness, the coupling force of the restriction ring 10 was increased in order of the first example>the second example>the third example>the fourth example>the fifth example>the sixth example>the seventh example>the first comparative example>the second comparative example.

Comparison between the measurement results (first and second examples) in which the center 14X of the weld portion 14 overlaps the range of the thick portion 15 and the measurement results (third and fourth examples) in which the center 14X of the weld portion 14 is excluded from the range of the thick portion 15 indicates that the coupling force tends to decrease at the restriction ring 10 in which the center 14X of the weld portion 14 is excluded from the range of the thick portion 15.

Furthermore, comparison between the third and fourth examples in which the center 14X of the weld portion 14 is excluded from the range of the thick portion 15 indicates that the third example in which the center is shifted from the thick portion 15 to the contracting portion 23 side was not substantially different from the first or second example. In contrast, in the fourth example in which the center is shifted from the thick portion 15 to the expanding portion 22 side, the coupling force is much lower than that in the first to third examples. It can be understood that the weld portion 14 covering the contracting portion 23 largely contributes to the coupling force.

In addition, comparison between the measurement results (fifth and sixth examples) in which the height Zh of the weld portion 14 was half or less of the thickness Zt of the restriction ring 10 and the height Zh of the weld portion 14 of the restriction ring 10 and the measurement result (seventh example) in which the height Zh of the weld portion 14 exceeded ½ of the thickness Zt of the restriction ring 10 indicates that the coupling force tended to decrease in the regulation ring 10 in which the height Zh of the weld portion 14 exceeded ½ of the thickness Zt of the restriction ring 10.

Figure 14:
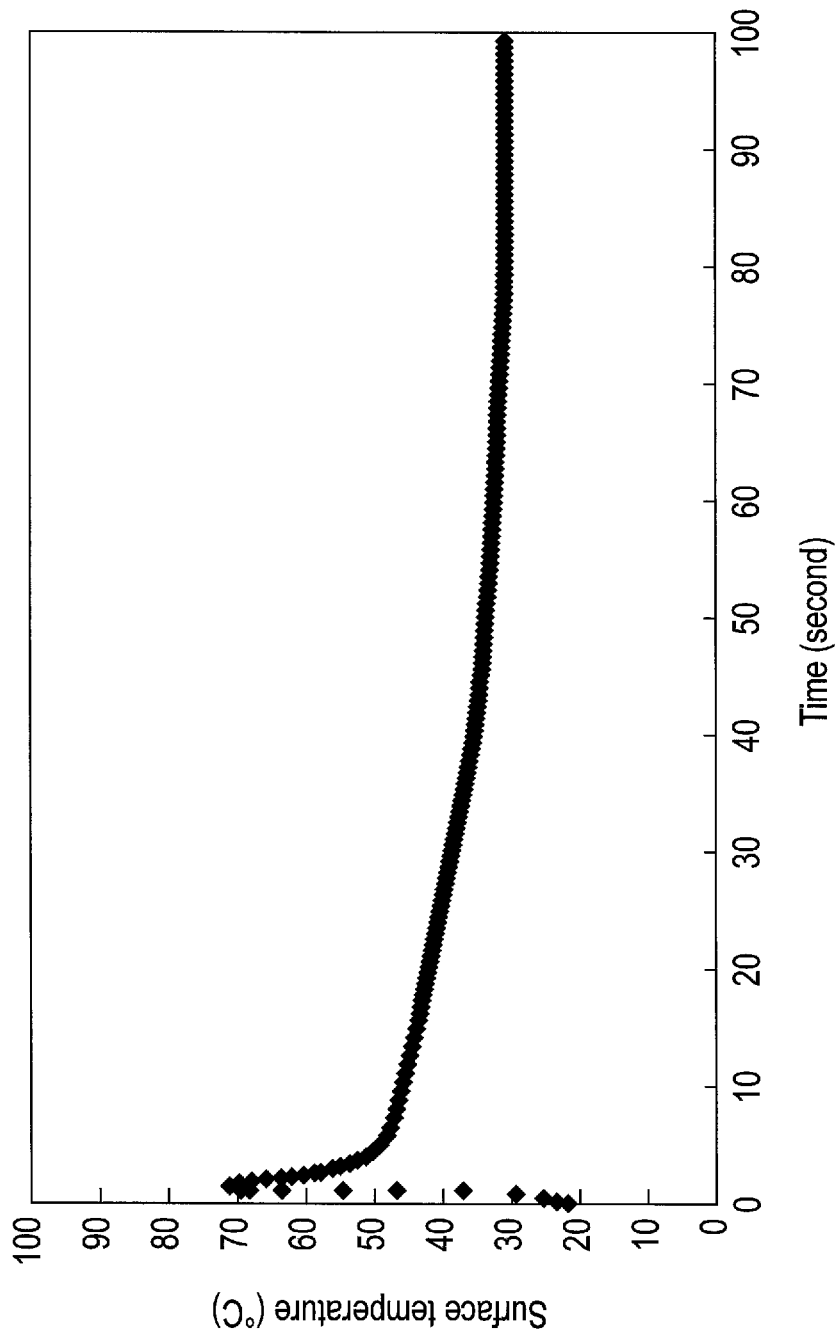
FIG. 14 is a graph showing an example of a surface temperature of a torsion portion in a welding process measured on the back side of the weld portion.

FIG. 14 is a graph showing an example of a surface temperature of torsion portion 2 in a welding process measured on the back side of the weld portion 14. As shown in FIG. 14, the temperatures of the torsion portion 2 and the restriction ring 10 instantaneously rise in the welding step. After that, the cooled restriction ring 10 contracts and engages with the coating film 5 of the bonding site 2B.

In addition, in the sites which are not integrated by welding, of the male portion 12 and the female portion 13, the male portion 12 and the female portion 13 are further firmly engaged with each other by the contraction of the cooled restriction ring 10. The surface temperature of the torsion portion 2 is, for example, 80° C. or less, which is much lower than the tempering temperature of the spring steel of the torsion portion 2 and the baking temperature of the coating film 5.

In the stabilizer 1 of the present embodiment configured as described above, the contracting portion 23 and the valley bottom portion 31 which have not contributed to the coupling force are integrated by the weld portion 14. The present embodiment can be configured such that not only the engagement between the expanding portion 22 and the pair of sandwiching portions 32 and 33, but the engagement between the contracting portion 23 and the valley bottom portion 31 contribute to the coupling force of the restriction ring 10.

As a result, the restriction ring 10 can bear a large component load, and the displacement of the torsion portion 2 in the axial direction X can be prevented more reliably. In addition, the restriction ring 10 can be applied to the stabilizer 1 having a large rigidity, to which the restriction ring 10 cannot be applied so far, and the displacement of the torsion portion 2 in the axial direction X can be prevented in a wider range of vehicle type.

If the torsion portion 2 is completely fixed to the bush B for the purpose of preventing the movement of the torsion portion 2 in the axial direction X, the torsion portion 2 cannot rotate and the spring characteristics of the stabilizer 1 will change.

If a thrust load is applied to cause plastic deformation such that the torsion portion 2 itself becomes locally large in diameter, the number of steps is remarkably increases and the cost increases as compared with the case where the restriction ring 10 is retrofitted. The presence or size of the restriction ring 10 cannot be flexibly changed depending on the vehicle type.

On the other hand, according to the present embodiment, the coupling force of the restriction ring 10 with respect to the torsion portion 2 can be improved while making use of the excellent merits of the restriction ring 10.

The height Zh of the weld portion 14 is preferably ½ or less of the thickness Zt. If the height Zh of the weld portion 14 is ½ or less of the thickness Zt, the weld portion 14 melts to a sufficient depth Zd in the thickness direction Z, and the contracting portion 23 and the valley bottom portion 31 can be thereby integrated firmly. In addition, interference between the restriction ring 10 and the other parts can be prevented by setting the height Zh of the weld portion 14 to ½ or less of the thickness Zt. Furthermore, since the height Zh of the weld portion 14 is used as an index, the amount of penetration of the weld portion 14 can be managed easily, and affecting the coating film of the stabilizer 1 due to excessive heat input during welding can be prevented effectively.

The present embodiment includes a band-like thick portion 15 which crosses the male portion 12 and the female portion 13. If the center 14X of the weld portion 14 is disposed so as to overlap the thick portion 15, the weld portion 14 can be formed so as to cover the entire male portion 12 with the weld portion 14 spreading from the thick portion 15. Since the weld portion 14 which covers not only the contracting portion 23 and the valley bottom portion 31, but the entire boundary between the male portion 12 and the female portion 13 can be formed, the restriction ring 10 can be coupled firmly.

The present embodiment includes a surrounding portion 17 from which the weld portion 14 is eliminated. The surrounding portion 17 is formed across the male portion 12 and the female portion 13, and is formed such that its side surface 10C is flush with the male portion 12 and the female portion 13.

According to the present embodiment, when the side surface 10C abuts on the bush B, the side surface 10C can be configured flat such that excessive load is not concentrated on the male portion 12 and the female portion 13. Furthermore, the influence of the heat input at the time of welding can be relaxed, and structural changes other than the weld portion 14 can be prevented in the restriction ring 10, by providing the surrounding portion 17.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stabilizer for a vehicle, the stabilizer comprising:
a torsion portion suspended from a body of the vehicle via a cylindrical bush;
a pair of arm portions extending from ends of the torsion portion to right and left wheels, and attached to suspension units; and
a restriction ring coupled to the torsion portion at a site adjacent to the bush,
wherein:
the restriction ring includes:
a main body;
a female portion located at a first end of the main body, the female portion including a valley bottom portion and a pair of sandwiching portions spaced apart from each other at an interval in an axial direction of the torsion portion with the interval being narrow at a position farther from the valley bottom portion;
a male portion including a neck portion extending from a second end of the main body and inserted between distal ends of the pair of sandwiching portions, an expanding portion being larger in the axial direction of the torsion portion at a position farther from the neck portion, and a contracting portion being smaller in the axial direction of the torsion portion at a position farther from the neck portion; and
a weld portion where the male portion and the female portion are welded,
the weld portion covers at least a range of the contracting portion and the valley bottom portion as viewed from an outer peripheral surface of the restriction ring, and melts in a thickness direction from the outer peripheral surface to integrate the contracting portion and the valley bottom portion,
the restriction ring further includes a surrounding portion surrounding the weld portion to expose the outer peripheral surface from the weld portion,
the surrounding portion is provided across both of the first end and the second end of the main body,
the surrounding portion includes a female side surrounding portion formed integrally with the female portion and a male side surrounding portion formed integrally with the male portion, and
the female side surrounding portion and the male side surrounding portion are formed to be flush with each other in the axial direction of the torsion portion.

2. The stabilizer of claim 1, wherein a height of the weld portion is ½ or less of a thickness of the restriction ring.

3. The stabilizer of claim 1, wherein the weld portion further covers a range of the expanding portion, the sandwiching portions, and the neck portion and has a circular shape as viewed from the outer peripheral surface.

4. The stabilizer of claim 1, wherein:
the restriction ring further includes a thick portion formed to be thicker than remaining portions of the restriction ring and crossing the male portion and the female portion in the axial direction of the torsion portion, and
a center of the weld portion overlaps the thick portion as viewed from the outer peripheral portion.

5. The stabilizer of claim 1, wherein:

the torsion portion and the pair of arms are coated with a coating film, the coating film at a site to which the restriction ring is coupled is formed to be thicker than the coating film of eyes formed at distal ends of the arms, and the restriction ring further includes an inner peripheral surface on which an uneven pattern harder than the coating film is formed.

6. A method of manufacturing a stabilizer for a vehicle, the stabilizer comprising:

a torsion portion suspended from a body of the vehicle via a cylindrical bush;

a pair of arm portions extending from ends of the torsion portion to right and left wheels, and attached to suspension units; and a restriction ring coupled to the torsion portion at a site adjacent to the bush, wherein:

the restriction ring includes:

a main body;

a female portion located at a first end of the main body, the female portion including a valley bottom portion and a pair of sandwiching portions spaced apart from each other by an interval in an axial direction of the torsion portion;

a male portion including a neck portion extending from a second end of the main body, an expanding portion being larger in the axial direction of the torsion portion at a position farther from the neck portion, and a contracting portion being smaller in the axial direction of the torsion portion at a position farther from the neck portion; and a weld portion where the male portion and the female portion are welded, the restriction ring further includes a surrounding portion surrounding the weld portion to expose an outer peripheral surface of the restriction ring from the weld portion, the surrounding portion is provided across both of the first end and the second end of the main body, the surrounding portion includes a female side surrounding portion formed integrally with the female portion and a male side surrounding portion formed integrally with the male portion, the female side surrounding portion and the male side surrounding portion are formed to be flush with each other in the axial direction of the torsion portion, and the method comprises:

a preparing step of arranging the main body so as to be wound around the torsion portion;

a caulking step of pressing the female portion against the male portion and plastically deforming the pair of sandwiching portions in a shape following the expanding portion; and a welding step of welding to cover at least a range of the contracting portion and the valley bottom portion as viewed from the outer peripheral surface of the restriction ring, and forming the weld portion melting in a thickness direction from the outer peripheral surface to integrate the contracting portion and the valley bottom portion.

7. The method of claim 6, wherein:

the torsion portion is covered with a coating film, and in the welding step, a temperature of the welded restriction ring rises instantaneously, and the cooled restriction ring contracts to agree with the coating film.

8. The method of claim 6, wherein the male portion further includes a guide portion guiding plastic deformation of the sandwiching portions.

\* \* \* \* \*